US012694238B2

(12) United States Patent (10) Patent No.: US 12,694,238 B2
Kamiyama (45) Date of Patent: Jul. 28, 2026

(54) CARD READER

(71) Applicant: NIDEC INSTRUMENTS CORPORATION, Nagano (JP)

(72) Inventor: Ryotaro Kamiyama, Nagano (JP)

( * ) Notice: Subject to any disclaimer, the term of this patent is extended or adjusted under 35 U.S.C. 154(b) by 0 days.

(21) Appl. No.: 19/344,356

(22) Filed: Sep. 29, 2025

(65) Prior Publication Data

US 2026/0093938 A1 Apr. 2, 2026

(30) Foreign Application Priority Data

Sep. 30, 2024 (JP) ................................. 2024-170777

(51) Int. Cl.
*G06K 7/10* (2006.01)
(52) U.S. Cl.
CPC ................................. *G06K 7/10297* (2013.01)
(58) Field of Classification Search
CPC . G06K 7/10297; G06K 7/0013; G06K 7/0004
USPC ....................................................... 235/451
See application file for complete search history.

(56) References Cited

U.S. PATENT DOCUMENTS

| 6,641,035 B1 * | 11/2003 | Predescu ................ G06K 13/08 |
| | | 235/382 |
| 11,977,949 B2 | 5/2024 | Hara et al. |
| 2017/0132437 A1 * | 5/2017 | Watanabe ............ G06K 7/0013 |
| 2021/0406486 A1 * | 12/2021 | Aiyoshi ............... G06K 7/0047 |
| 2023/0169283 A1 * | 6/2023 | Hara .................. G06K 7/10722 |
| | | 235/451 |

* cited by examiner

*Primary Examiner* — Ahshik Kim
(74) *Attorney, Agent, or Firm* — HAUPTMAN HAM, LLP

(57) ABSTRACT

A card reader which is attached to an attaching face on an inner side of a case of an information apparatus and is capable of accessing information of a card includes a card reader main body part, a cover member which is fixed to a front side of the card reader main body part, and an antenna which is disposed inside the cover member and communicates with the card in a non-contact manner for accessing the information. The cover member is provided with a protruding part which is inserted into an attaching hole part provided in the case and protrudes to a front side from the case, and a flange part which is connected to an end part on a rear side of the protruding part and is fixed to the attaching face. The antenna is disposed in an internal space of the protruding part.

17 Claims, 6 Drawing Sheets

CARD READER

CROSS REFERENCE TO RELATED APPLICATION

The present invention claims priority under 35 U.S.C. § 119 to Japanese Application No. 2024-170777 filed Sep. 30, 2024, the entire content of which is incorporated herein by reference.

FIELD OF THE INVENTION

At least an embodiment of the present invention may relate to a card reader.

An information apparatus such as a game apparatus installed in a casino, a game center (penny arcade) and the like is attached with a card reader which is capable of reading and writing information of a card. Such a card reader is described in Japanese Patent Laid-Open No. 2023-80537 (Patent Literature 1). A card reader described in Patent Literature 1 is attached to an attaching face on an inner side of a case of an information apparatus. The card reader includes a card reader main body, a board which is fixed to the card reader main body, a cover member which covers the board from an opposite side to the card reader main body, and a non-contact communication antenna disposed on a surface of the board. The cover member is provided with a protruding part which is inserted into an attaching hole part provided in the case and protrudes from the case toward a front side that is an outer side, and a flange part which is connected with an end part on a rear side of the protruding part and is fixed to the attaching face. The antenna disposed on the surface of the board is located on a rear side with respect to the flange part. The antenna communicates with a card in a non-contact manner and reads and writes information of the card.

In the card reader described in Patent Literature 1, the antenna is located on a rear side with respect to the flange part and thus, the antenna is located on an inner side of the case. Therefore, when the antenna communicates with a card in a non-contact manner, the antenna is easily affected by the case. Especially, when the case is made of metal, the antenna is further easily affected by the case. As a result, when the antenna communicates with a card in a non-contact manner, normal communication may be difficult to be performed.

SUMMARY

In view of the problem described above, at least an embodiment of the present invention may advantageously provide a card reader in which an antenna is hard to be affected by the case.

According to at least an embodiment of the present invention, there may be provided a card reader which is attached to an attaching face on an inner side of a case of an information apparatus and is capable of accessing information of a card. The card reader includes a card reader main body part, a cover member which is fixed to a front side of the card reader main body part, and an antenna which is disposed inside the cover member and communicates with the card in a non-contact manner for accessing the information. The cover member is provided with a protruding part which is inserted into an attaching hole part provided in the case and protrudes to a front side from the case, and a flange part which is connected with an end part on a rear side of the protruding part and is fixed to the attaching face, and the antenna is disposed in an internal space of the protruding part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of a card reader to which the present invention is applied will be described below with reference to the accompanying drawings.

First Embodiment

Figure 1:
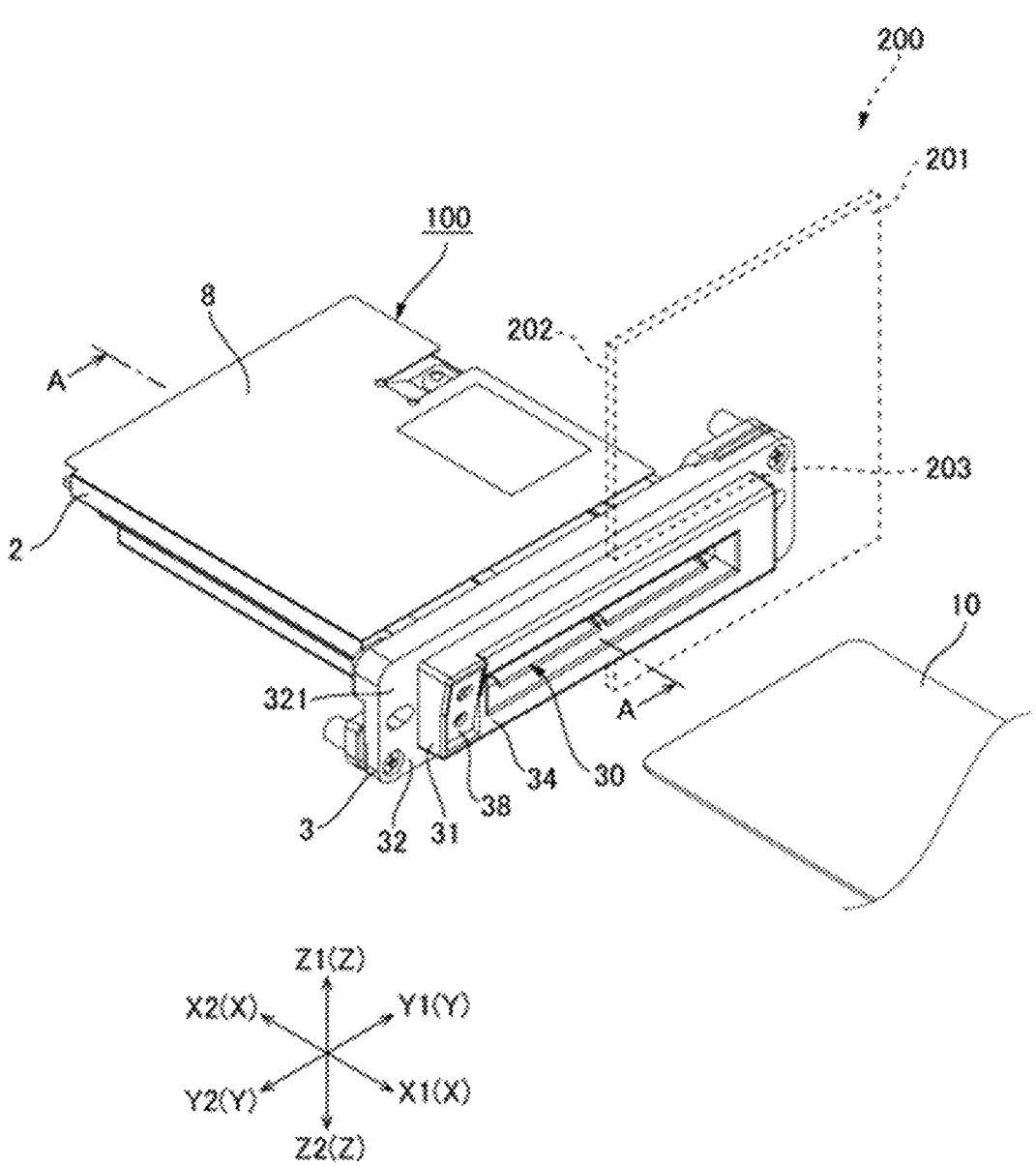
FIG. 1 is an outside appearance perspective view showing a card reader in accordance with a first embodiment of the present invention.
Figure 2:
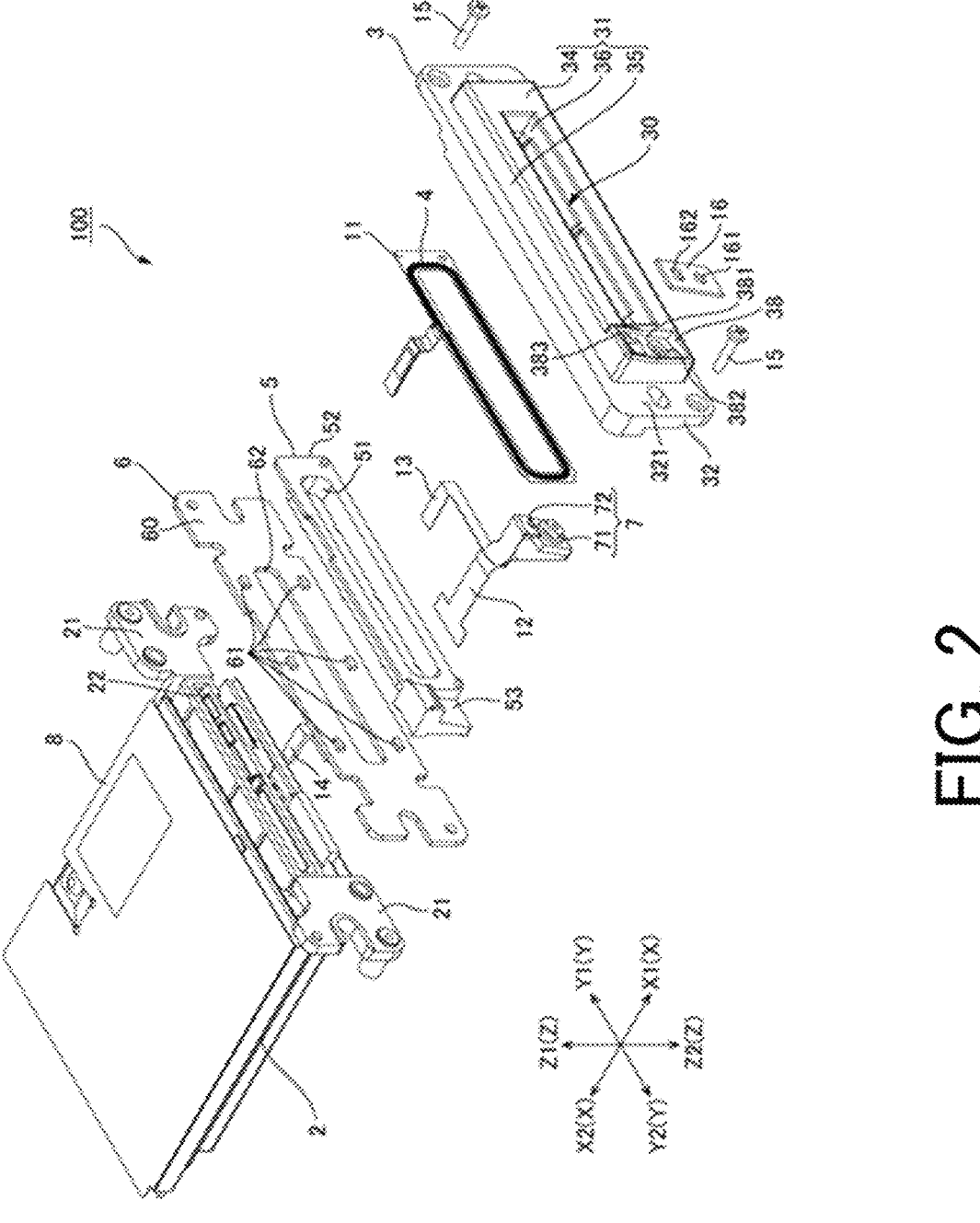
FIG. 2 is an exploded perspective view showing the card reader in accordance with the first embodiment of the present invention.
Figure 3:
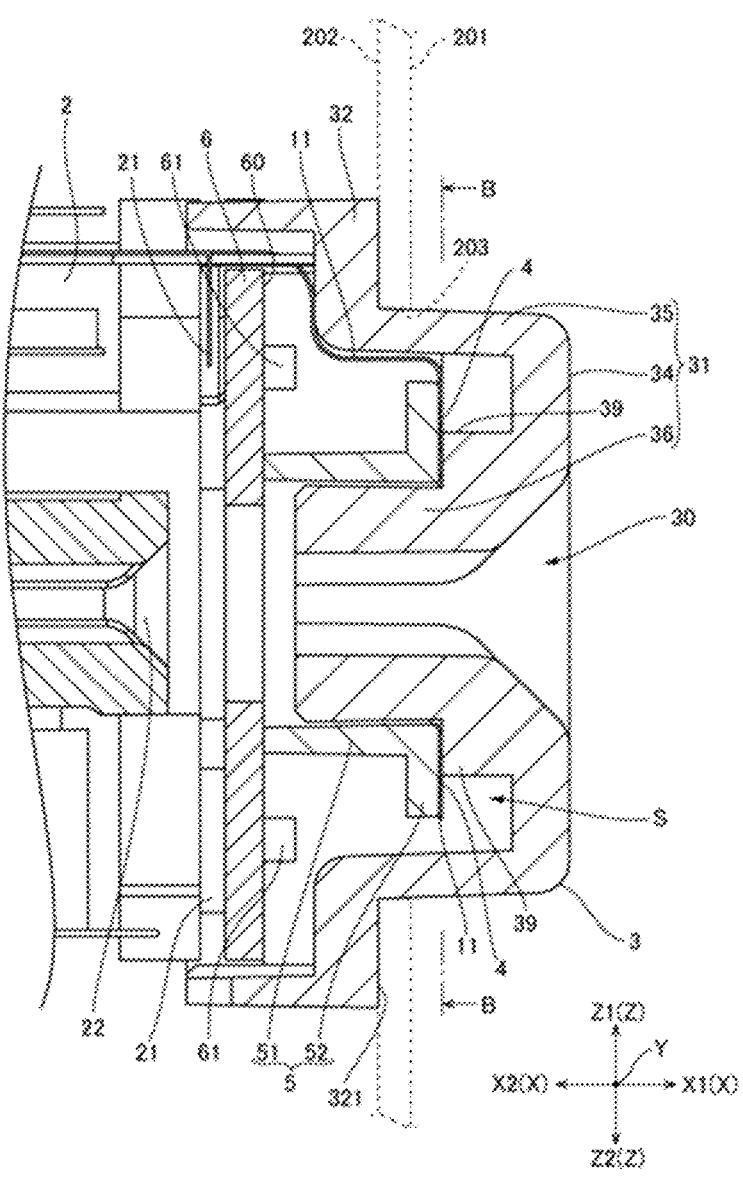
FIG. 3 is a schematic cross-sectional view showing the card reader which is cut by the "A-A" in FIG. 1.
Figure 4:
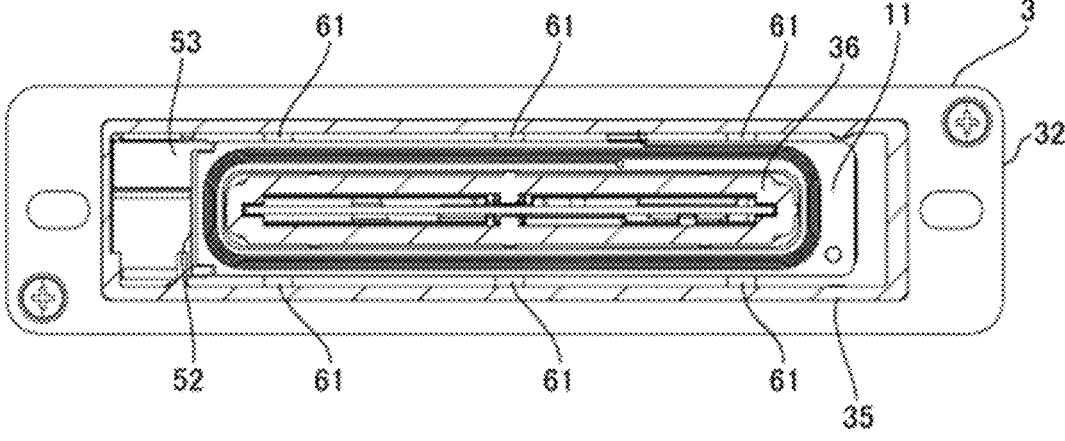
FIG. 4 is a schematic cross-sectional view showing the card reader which is cut by the "B-B" in FIG. 3.
Figure 4:
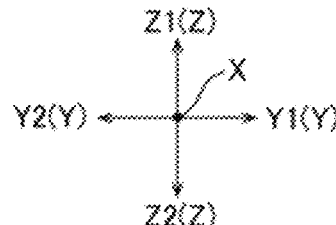
Figure 5:
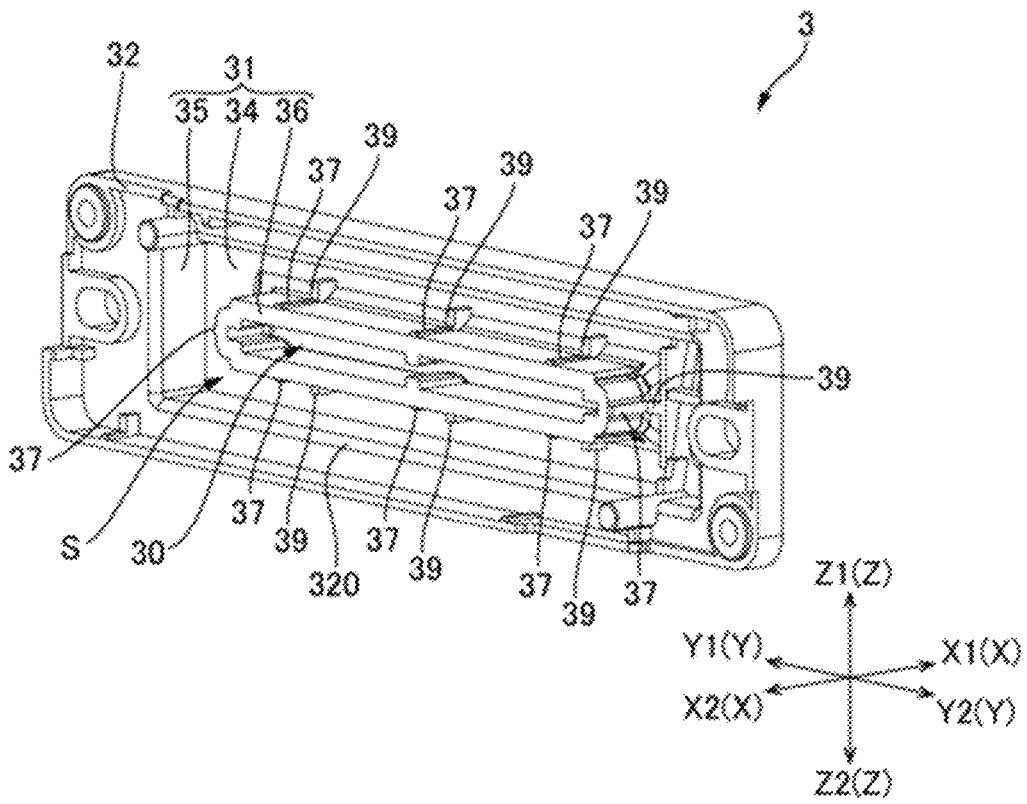
FIG. 5 is a perspective view showing a cover member.

FIG. 1 is an outside appearance perspective view showing a card reader in accordance with a first embodiment of the present invention. FIG. 2 is an exploded perspective view showing the card reader in accordance with the first embodiment of the present invention. FIG. 3 is a schematic cross-sectional view showing the card reader which is cut by the "A-A" in FIG. 1. FIG. 4 is a schematic cross-sectional view showing the card reader which is cut by the "B-B" in FIG. 3. FIG. 5 is a perspective view showing a cover member. In FIG. 4, an imaging part 7 is not shown.

In this specification, three directions of the X, Y and Z are axes perpendicular to each other. The X-direction along the X-axis is a front-rear direction of a card reader 100. In the X-direction, the X1-direction side is a front side, and the X2-direction side is a rear side. A card 10 is inserted into the card reader 100 to the X2-direction and is taken out from the card reader 100 to the X1-direction. The Y-direction along the Y-axis is a width direction of the card reader 100. The Z-direction along the Z-axis is a height (thickness) direction of the card reader 100. In the Z-direction, the Z1-direction side is an upper side and the Z2-direction side is a lower side.

The card reader 100 shown in FIG. 1 is a device for performing reading of data recorded in a card 10 and recording of data to the card 10. For example, the card reader 100 is mounted on an information apparatus 200 such as a game apparatus installed in a casino, a game center (penny arcade) and the like. The card reader 100 is attached to an inner side attaching face 202 of a case 201 of the information apparatus 200. In FIG. 1, the case 201 is shown in a partial cross-sectional view. An attaching hole part 203 is a substantially rectangular shape whose long-side direction is the Y-direction.

A card 10 is, for example, a card made of vinyl chloride in a substantially rectangular shape whose thickness is about 0.7-0.8 mm. A back face of the card 10 is formed with a magnetic stripe (not shown) where magnetic data are recorded. Further, the card 10 has a built-in IC chip, and a front face of the card 10 is formed with an external connection terminal (not shown) of the IC chip. In this embodiment, the card 10 may be formed with only one of the magnetic stripe or the external connection terminal. Further, the card 10 may be a PET (polyethylene terephthalate) card whose thickness is about 0.18-0.36 mm or may be a paper card or the like having a predetermined thickness.

The card reader 100 in this embodiment is capable of accessing information of the card 10. Specifically, the card reader 100 has a function for performing reading and writing information of a card 10 by being in contact with the card 10 and accessing information of the card 10, and a function for performing reading and writing information of a card 10 by communicating with the card 10 in a non-contact manner and accessing information of the card 10. As shown in FIGS. 1 and 2, the card reader 100 includes a card reader main body part 2 and a cover member 3 which is fixed to the X1-direction side of the card reader main body part 2. The cover member 3 is provided with an insertion slot 30 which is connected with a card passage 22 of the card reader main body part 2. A card 10 is inserted from the insertion slot 30. The card reader main body part 2 includes a magnetic head structured to perform reading of magnetic data recorded in a magnetic stripe of a card 10 inserted into the card passage 22 and writing of magnetic data, an IC contact block structured to be in contact with an external connection terminal of an IC chip of the card 10 and perform communication of data with the card 10, and the like. A base plate 21 (first end part) for fixing the cover member 3 is provided on the X1-direction side of the card reader main body part 2. The base plate 21 is located on outer sides in the Y-direction with respect to the card passage 22.

The cover member 3 is made of resin having a light-transmitting property. As shown in FIGS. 1 and 2, the cover member 3 is fixed to the base plate 21 by a screw 15. As shown in FIGS. 2, 3 and 5, the cover member 3 is provided with a protruding part 31 which is inserted into the attaching hole part 203 provided in the case 201 and protrudes to the X1-direction from the case 201, and a flange part 32 which is connected with an end part in the X2-direction of the protruding part 31 and is fixed to the attaching face 202. The protruding part 31 is formed in a substantially rectangular shape whose long-side direction is the Y-direction and is inserted into the attaching hole part 203 from the X2-direction side. The flange part 32 is fixed to the attaching face 202 by a fixing member such as a screw not shown. In this manner, the card reader 100 is attached on an inner side of the case 201 of the information apparatus 200. In this embodiment, the case 201 is made of resin or metal.

As shown in FIGS. 2, 3 and 5, the protruding part 31 is provided with a front face part 34 which is formed with the insertion slot 30, an outer peripheral wall part 35 which is extended in the X2-direction from an outer circumferential edge of the front face part 34 and is connected with the flange part 32, and an opening tube part 36 which surrounds an edge part of the insertion slot 30 and protrudes to the X2-direction from the front face part 34. A holding part 38 for holding an imaging part 7 is provided in an end part in the Y2-direction of the front face part 34. A tip end face 381 on the "X2" side of the holding part 38 is inclined obliquely downward with respect to the "Y-Z" face which is a vertical plane. An internal space "S" is formed between the outer peripheral wall part 35 and the opening tube part 36, As shown in FIGS. 2, 3 and 5, the flange part 32 is a substantially rectangular shape which is enlarged from an end part in the X2-direction of the protruding part 31 to the Y-direction and the Z-direction and whose long-side direction is the Y-direction. The flange part 32 is provided with a flange face 321 which faces the X1-direction. The flange face 321 is in contact with the attaching face 202. The flange part 32 is formed with an opening part 320. The opening part 320 leads to the internal space "S".

As shown in FIGS. 1 and 2, the card reader 100 includes an antenna 4, a spacer member 5, a rigid board 6, the imaging part 7 and a control board 8. The control board 8 is attached to an end part in the Z1-direction of the card reader main body part 2. The control board 8 is mounted with a CPU and the like for controlling the card reader 100.

The antenna 4 communicates with a card 10 in a non-contact manner for accessing information of the card 10. As a result, the card reader 100 reads and writes information of the card 10 through the antenna 4. As shown in FIGS. 2 through 4, the antenna 4 is mounted on a flexible printed board 11. The flexible printed board 11 is electrically connected with the control board 8. The antenna 4 is disposed inside the cover member 3. Specifically, the antenna 4 is disposed in the internal space "S" of the protruding part 31. As shown in FIG. 4, the antenna 4 is disposed so as to surround the opening tube part 36 when viewed in the X-direction.

The spacer member 5 is made of resin having a light-transmitting property. As shown in FIGS. 2 and 3, the spacer member 5 is disposed in the internal space "S" from the opening part 320. The spacer member 5 is provided with a frame part 51 which is fitted to the opening tube part 36 and is extended to the X-direction, an arrangement face part 52 which is connected with an end part in the X1-direction of the frame part 51 and faces the X1-direction, and a holding part 53 for holding the imaging part 7. The holding part 53 is provided on the Y2-direction side with respect to the frame part 51 and the arrangement face part 52. In this embodiment, the frame part 51 is formed in a tube shape which is extended in the X-direction. As shown in FIG. 3, the arrangement face part 52 is located on the X1-direction side with respect to the case 201. As a result, the antenna 4 is located on an outer side with respect to the case 201.

The flexible printed board 11 is attached to the arrangement face part 52. As a result, the antenna 4 is disposed on the arrangement face part 52. In this embodiment, as shown in FIG. 5, an outer peripheral face of the opening tube part 36 is provided with a plurality of ribs 37 extending in the X-direction. A positioning end part 39 is provided on an inner side of the protruding part 31. In this embodiment, eight ribs 37 are provided. The positioning end part 39 is continuously provided in an end part in the X1-direction of the rib 37. The spacer member 5 is positioned with respect to the opening tube part 36 by an inner peripheral face of the frame part 51 coming in contact with the ribs 37 when fitted to the opening tube part 36. In other words, the frame part 51 is lightly press-fitted to the opening tube part 36. Further, the spacer member 5 is, when fitted to the opening tube part 36, positioned in the X-direction by the arrangement face part 52 coming in contact with the positioning end parts 39.

As shown in FIG. 2, the rigid board 6 is a substantially rectangular flat plate shape whose long-side direction is the Y-direction. The rigid board 6 is disposed between the flange part 32 and the base plate 21 and closes the opening part 320. In this embodiment, as shown in FIG. 3, the spacer member 5 is sandwiched between the rigid board 6 and the positioning end parts 39 provided on an inner side of the protruding part 31 in the X-direction. As a result, the spacer member 5 is fixed between the rigid board 6 and the cover member 3.

As shown in FIG. 2, the rigid board 6 is provided with a plurality of light emitting elements 61 on a first face 60 facing the X1-direction. The light emitting element 61 is an LED and irradiates light toward the cover member 3. Three light emitting elements 61 which are arranged in the Y-direction are respectively mounted on the Z1-direction side and the Z2-direction side with respect to a card passing opening 62 of the rigid board 6. In the Z1-direction and the Z2-direction with respect to the card passing opening 62, three light emitting elements 61 are respectively disposed at a center in the Y-direction and both ends in the Y-direction of the card passing opening 62. The rigid board 6 is electrically connected with the control board 8 through a flexible printed board 14. Light emission intensity of the light emitting element 61 is controlled by an LED control circuit which is mounted on the control board 8. As shown in FIG. 4, when viewed from the X1-direction side, the light emitting elements 61 are overlapped with the protruding part 31. Further, at least a part of the light emitting element 61 does not overlap with the arrangement face part 52 when viewed from the X1-direction side. As a result, the light emitting element 61 is capable of irradiating light toward the front face part 34 and thus, a periphery around the insertion slot 30 is lighted. Further, the spacer member 5 has a light-transmitting property and thus, light irradiated from the light emitting element 61 passes through the spacer member 5 and the opening tube part 36 and an inner side of the insertion slot 30 is also lighted.

As shown in FIG. 2, the imaging part 7 is disposed in the front face part 34. The imaging part 7 includes a camera module 71 and a light-emitting part 72. The imaging part 7 is held by the holding part 53 and is accommodated on an inner side of the holding part 38. The camera module 71 images an obliquely lower side from an opening part 382 provided in the tip end face 381. The light-emitting part 72 irradiates light to an obliquely lower side from an opening part 383 provided in the tip end face 381.

A cover plate 16 is attached to the tip end face 381. The cover plate 16 is provided with a first light transmitting part 161 facing the camera module 71 and a second light transmitting part 162 facing the light-emitting part 72. The first light transmitting part 161 and the second light transmitting part 162 are made of transparent material. In this embodiment, the entire cover plate 16 may be formed of transparent material.

A flexible printed board 12 is connected to a bottom part of the camera module 71. The camera module 71 is connected with the control board 8 through the flexible printed board 12. The camera module 71 images a one-dimensional code or two-dimensional code on a card 10 through the first light transmitting part 161.

The light-emitting part 72 is a light emitting element such as an LED. The light-emitting part 72 is connected with the control board 8 through a flexible printed board 13. Light of the light-emitting part 72 is irradiated from the second light transmitting part 162 toward a card 10 which is disposed in the X1-direction with respect to the cover plate 16.

Operations and Effects

The card reader 100 in this embodiment includes the card reader main body part 2, the cover member 3 fixed to the X1-direction side of the card reader main body part 2, and the antenna 4 which is disposed inside the cover member 3 and communicates with the card 10 in a non-contact manner for accessing information of the card 10. The cover member 3 is provided with the protruding part 31 which is inserted into the attaching hole part 203 provided in the case 201 and protrudes to the X1-direction from the case 201, and the flange part 32 which is connected with an end part on the X2-direction side of the protruding part 31 and is fixed to the attaching face 202. The antenna 4 is disposed in the internal space "S" of the protruding part 31.

In the card reader 100 in this embodiment, the antenna 4 is disposed in the internal space "S" of the protruding part 31 and thus, the antenna 4 is not located on an inner side of the case 201. As a result, in a case that the antenna 4 communicates with a card 10 in a non-contact manner, the antenna 4 is hard to be affected by the case 201 and thus, communication can be performed normally.

When viewed in the Y-direction, the antenna 4 is located on an outer side of the case 201. As a result, when the antenna 4 communicates with a card 10 in a non-contact manner, the antenna 4 is further hard to be affected by the case 201.

The card reader 100 includes the spacer member 5 which is disposed in the internal space "S" from the opening part 320 formed in the flange part 32. The antenna 4 is disposed on the arrangement face part 52 provided on the X1-direction side of the spacer member 5. As a result, the antenna 4 is easily disposed in the internal space "S" separated from the flange part 32 to the X1-direction.

The card reader 100 includes the rigid board 6 which is disposed between the flange part 32 and the base plate 21 (first end part) in the X1-direction of the card reader main body part 2 and closes the opening part 320. The spacer member 5 is sandwiched between the rigid board 6 and the positioning end parts 39 provided on an inner side of the protruding part 31 in the X-direction. As a result, the spacer member 5 can be fixed easily by fixing the cover member 3 to the card reader main body part 2.

The protruding part 31 is provided with the front face part 34 formed with the insertion slot 30 for taking a card 10 into the card reader main body part 2, the outer peripheral wall part 35 which is extended to the X2-direction from an outer circumferential edge of the front face part 34 and is connected with the flange part 32, and the opening tube part 36 which surrounds an edge part of the insertion slot 30 and protrudes to the X2-direction from the front face part 34. The internal space "S" is formed between the outer peripheral wall part 35 and the opening tube part 36. The antenna 4 is, when viewed in the X-direction, disposed so as to surround the opening tube part 36. As a result, even when the insertion slot 30 is formed in the front face part 34 of the protruding part 31, a size of the antenna 4 can be increased.

The spacer member 5 is provided with the frame part 51 which is fitted to the opening tube part 36 and extends in the X-direction, and the arrangement face part 52 which is connected with an end part in the X1-direction of the frame part 51 and faces the X1-direction. As a result, even when the cover member 3 is provided with the insertion slot 30, the spacer member 5 is easily disposed in the internal space "S" of the protruding part 31.

The outer peripheral face of the opening tube part 36 is provided with a plurality of the ribs 37 extended in the X-direction. The spacer member 5 is, when fitted to the opening tube part 36, positioned on the opening tube part 36 by the inner peripheral face of the frame part 51 coming in contact with the ribs 37. As a result, positioning of the spacer member 5 with respect to the opening tube part 36 is easily performed.

The cover member 3 is made of resin having a light-transmitting property. The rigid board 6 includes a plurality of the light emitting elements 61 on the first face 60 which faces the X1-direction side. When viewed from the X1-direction side, the light emitting elements 61 overlap with the protruding part 31. When viewed from the X1-direction side, at least a part of the light emitting element 61 does not overlap with the arrangement face part 52. As a result, the light emitting element 61 is capable of irradiating light toward the front face part 34 and thus, the periphery of the insertion slot 30 can be surely lighted.

The card reader 100 includes the imaging part 7 which is disposed in the front face part 34 and images a one-dimensional code or two-dimensional code on a card 10. As a result, the imaging part 7 is disposed in the front face part 34 and thus, in comparison with a case that the imaging part 7 is disposed in a portion different from the front face part 34, a shape of the cover member 3 is hard to be complicated.

Second Embodiment

Figure 6:
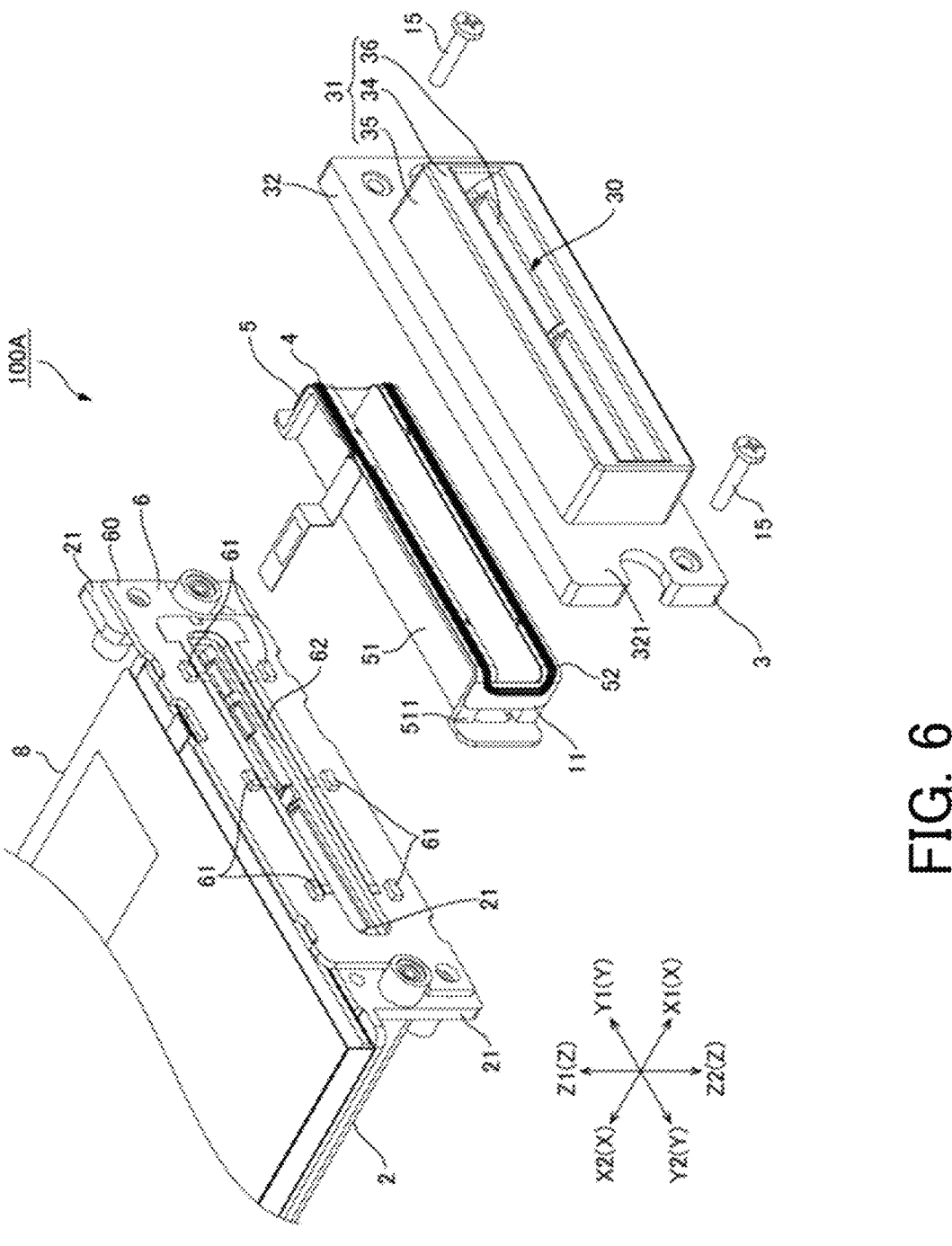
FIG. 6 is an exploded perspective view showing a card reader in accordance with a second embodiment of the present invention.

FIG. 6 is an exploded perspective view showing a card reader 100A in accordance with a second embodiment of the present invention. A card reader 100A in a second embodiment has the same structure as the card reader 100 in the first embodiment except that the imaging part 7 is not provided. Therefore, in the second embodiment, the same reference symbols are used in the same structures in the first embodiment and their descriptions may be omitted.

A spacer member 5 is made of resin having a light-transmitting property. The spacer member 5 is disposed in the internal space "S" from the opening part 320. As shown in FIG. 6, the spacer member 5 is provided with a frame part 51 which is fitted into the opening tube part 36 and extends in the X-direction, and an arrangement face part 52 which is connected to an end part in the X1-direction of the frame part 51 and faces the X1-direction. Both ends in the Y-direction of the frame part 51 are provided with side wall parts 511 extending in the X-direction. The side wall part 511 is continuously connected with the arrangement face part 52. A flexible printed board 11 is structured so that its center portion is attached to the arrangement face part 52 and their both end parts in the Y-direction are bent to the X2-direction and are attached to the side wall parts 511. Therefore, an antenna 4 is bent to the X2-direction on both sides in the Y-direction (longitudinal direction) of the insertion slot 30. As a result, even in a case that an internal space "S" on both sides in the Y-direction of the insertion slot 30 is narrowed by narrowing a width in the Y-direction of the protruding part 31, the antenna 4 can be disposed so as to surround the opening tube part 36.

Other Embodiments

The card reader 100 in the embodiment described above has a function for reading and writing information of a card 10 by contacting with the card 10 and accessing information of the card 10 and a function for reading and writing information of a card 10 by communicating with the card 10 in a non-contact manner and accessing information of the card 10. However, a card reader in another embodiment may have only a function for reading and writing information of a card 10 by communicating with a card 10 in a non-contact manner and accessing information of the card 10.

In the card reader 100 in the embodiment described above, reading and writing information of a card 10 is performed by accessing information of the card 10. However, in a card reader in another embodiment, only reading of information of a card 10 may be performed by accessing information of the card 10.

Embodiments of the present invention may be structured as follows.

(1) In a card reader which is attached to an attaching face on an inner side of a case of an information apparatus and is capable of accessing information of a card, the card reader includes: a card reader main body part;
a cover member which is fixed to a front side of the card reader main body part; and
an antenna which is disposed inside the cover member and communicates with the card in a non-contact manner for accessing the information,
the cover member is provided with a protruding part which is inserted into an attaching hole part provided in the case and protrudes to a front side from the case, and a flange part which is connected to an end part on a rear side of the protruding part and is fixed to the attaching face, and
the antenna is disposed in an internal space of the protruding part.

(2) The card reader described in the above-mentioned structure (1), where the antenna is located on an outer side with respect to the case when viewed in a direction perpendicular to a front-rear direction.

(3) The card reader described in the above-mentioned structure (1) or (2), where the card reader further includes a spacer member which is disposed in the internal space from an opening part formed in the flange part, and the antenna is disposed in an arrangement face part provided on a front side of the spacer member.

(4) The card reader described in the above-mentioned structure (3), where the card reader further includes a board which is disposed between the flange part and a first end part on a front side of the card reader main body part and closes the opening part, and the spacer member is sandwiched between the board and a positioning end part provided on an inner side of the protruding part in a front-rear direction.

(5) The card reader described in the above-mentioned structure (3) or (4), where
the protruding part is provided with a front face part which is formed with an insertion slot for taking the card into the card reader main body part, an outer peripheral wall part which is extended to a rear side from an outer circumferential edge of the front face part and is connected to the flange part, and an opening tube part which surrounds an edge part of the insertion slot and is protruded to a rear side from the front face part,
the internal space is formed between the outer peripheral wall part and the opening tube part, and
the antenna is disposed so as to surround the opening tube part when viewed in a front-rear direction.

(6) The card reader described in the above-mentioned structure (5), where the spacer member is provided with a frame part which is fitted to the opening tube part and extends in the front-rear direction, and the arrangement face part which is connected to an end part on a front side of the frame part and faces the front side.

(7) The card reader described in the above-mentioned structure (6), where an outer peripheral face of the opening tube part is provided with a plurality of ribs which extend in the front-rear direction, and the spacer member is positioned with respect to the opening tube part by an inner peripheral face of the frame part coming into contact with the ribs when the spacer member is fitted to the opening tube part.

(8) The card reader described in one of the above-mentioned structures (5) through (7), where the antenna is bent to a rear side on both sides in a longitudinal direction of the insertion slot.

(9) The card reader described in the above-mentioned structure (4), where the cover member is made of resin having a light-transmitting property, the board is provided with a plurality of light emitting elements on a first face facing the front side, the light emitting element overlaps with the protruding part when viewed from the front side, and at least a part of the light emitting element does not overlap with the arrangement face part when viewed from the front side.

(10) The card reader described in one of the above-mentioned structures (5) through (8), where the card reader further includes an imaging part which is disposed in the front face part and images a one-dimensional code or two-dimensional code on the card.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader which is attached to an attaching face on an inner side of a case of an information apparatus and is capable of accessing information of a card, comprising:
a card reader main body part;
a cover member which is fixed to a front side of the card reader main body part; and
an antenna which is disposed inside the cover member and communicates with the card in a non-contact manner for accessing the information,
wherein the cover member comprises:
a protruding part which is inserted into an attaching hole part provided in the case and protrudes to a front side from the case; and
a flange part which is connected to an end part on a rear side of the protruding part and is fixed to the attaching face; and
the antenna is disposed in an internal space of the protruding part.

2. The card reader according to claim 1, wherein the antenna is located on an outer side with respect to the case when viewed in a direction perpendicular to a front-rear direction.

3. The card reader according to claim 1, further comprising a spacer member which is disposed in the internal space from an opening part formed in the flange part,
wherein the antenna is disposed in an arrangement face part provided on a front side of the spacer member.

4. The card reader according to claim 3, further comprising a board which is disposed between the flange part and a first end part on the front side of the card reader main body part and closes the opening part, wherein the spacer member is sandwiched between the board and a positioning end part provided on an inner side of the protruding part in a front-rear direction.

5. The card reader according to claim 3, wherein the protruding part comprises:
a front face part which is formed with an insertion slot for taking the card into the card reader main body part;
an outer peripheral wall part which is extended to a rear side from an outer circumferential edge of the front face part and is connected with the flange part; and
an opening tube part which surrounds an edge part of the insertion slot and is protruded to the rear side from the front face part,
the internal space is formed between the outer peripheral wall part and the opening tube part, and
the antenna is disposed so as to surround the opening tube part when viewed in a front-rear direction.

6. The card reader according to claim 5, wherein the spacer member comprises a frame part which is fitted to the opening tube part and extends in the front-rear direction, and the arrangement face part which is connected with an end part on the front side of the frame part and faces the front side.

7. The card reader according to claim 6, wherein an outer peripheral face of the opening tube part comprises a plurality of ribs which extend in the front-rear direction, and
the spacer member is positioned with respect to the opening tube part by an inner peripheral face of the frame part coming into contact with the ribs when the spacer member is fitted to the opening tube part.

8. The card reader according to claim 5, wherein the antenna is bent to the rear side on both sides in a longitudinal direction of the insertion slot.

9. The card reader according to claim 4, wherein the cover member is made of resin having a light-transmitting property,
the board comprises a plurality of light emitting elements on a first face facing the front side,
the light emitting element overlaps with the protruding part when viewed from the front side, and
at least a part of the light emitting element does not overlap with the arrangement face part when viewed from the front side.

10. The card reader according to claim 5, further comprising an imaging part which is disposed in the front face part and images a one-dimensional code or two-dimensional code on the card.

11. The card reader according to claim 4, wherein the protruding part comprises:
a front face part which is formed with an insertion slot for taking the card into the card reader main body part;
an outer peripheral wall part which is extended to a rear side from an outer circumferential edge of the front face part and is connected with the flange part; and
an opening tube part which surrounds an edge part of the insertion slot and is protruded to the rear side from the front face part,
the internal space is formed between the outer peripheral wall part and the opening tube part, and
the antenna is disposed so as to surround the opening tube part when viewed in the front-rear direction.

12. The card reader according to claim 11, wherein the spacer member comprises a frame part which is fitted to the opening tube part and extends in the front-rear direction, and the arrangement face part which is connected with an end part on the front side of the frame part and faces the front side.

13. The card reader according to claim 12, wherein an outer peripheral face of the opening tube part comprises a plurality of ribs which extend in the front-rear direction, and the spacer member is positioned with respect to the opening tube part by an inner peripheral face of the frame part coming into contact with the ribs when the spacer member is fitted to the opening tube part.

14. The card reader according to claim 11, wherein the antenna is bent to the rear side on both sides in a longitudinal direction of the insertion slot.

15. The card reader according to claim 11, further comprising an imaging part which is disposed in the front face part and images a one-dimensional code or two-dimensional code on the card.

16. The card reader according to claim 2, further comprising a spacer member which is disposed in the internal space from an opening part formed in the flange part, wherein the antenna is disposed in an arrangement face part provided on a front side of the spacer member.

17. The card reader according to claim 16, further comprising a board which is disposed between the flange part and a first end part on the front side of the card reader main body part and closes the opening part, wherein the spacer member is sandwiched between the board and a positioning end part provided on an inner side of the protruding part in the front-rear direction.

\* \* \* \* \*